(12) United States Patent
Hashimoto et al.

(10) Patent No.: US 8,788,177 B2
(45) Date of Patent: Jul. 22, 2014

(54) CONTROL APPARATUS FOR VEHICLE

(71) Applicants: Toshiya Hashimoto, Miyoshi (JP);
Hideaki Yaguchi, Toyota (JP)

(72) Inventors: Toshiya Hashimoto, Miyoshi (JP);
Hideaki Yaguchi, Toyota (JP)

(73) Assignee: Toyota Jidosha Kabushiki Kaisha,
Toyota-shi (JP)

( * ) Notice: Subject to any disclaimer, the term of this patent is extended or adjusted under 35 U.S.C. 154(b) by 0 days.

(21) Appl. No.: 13/707,254

(22) Filed: Dec. 6, 2012

(65) Prior Publication Data

US 2013/0151110 A1      Jun. 13, 2013

(30) Foreign Application Priority Data

Dec. 9, 2011   (JP) .................................. 2011-270413

(51) Int. Cl.
*B60W 30/18* (2012.01)
*B60W 20/00* (2006.01)
*B60W 10/06* (2006.01)
*B60W 50/035* (2012.01)
*B60W 10/08* (2006.01)
*B60W 50/038* (2012.01)

(52) U.S. Cl.
CPC .......... *B60W 30/18* (2013.01); *B60W 2540/10* (2013.01); *B60W 20/50* (2013.01); *B60W 50/035* (2013.01); *Y10S 903/93* (2013.01); *B60W 10/08* (2013.01); *B60W 10/06* (2013.01); *B60W 50/038* (2013.01); *Y02T 10/6286* (2013.01); *B60W 20/00* (2013.01); *B60W 2710/0677* (2013.01); *B60W 2540/12* (2013.01)
USPC .............................. 701/99; 477/182; 903/930

(58) Field of Classification Search
CPC ...... B60W 10/08; B60W 10/06; B60W 20/00
USPC ............................................ 701/99; 477/182
See application file for complete search history.

(56) References Cited

U.S. PATENT DOCUMENTS

| 5,439,429 | A | * | 8/1995 | Lee | 477/207 |
| 6,412,886 | B1 | * | 7/2002 | Abe et al. | 303/139 |
| 7,894,968 | B2 | * | 2/2011 | Stroh et al. | 701/84 |
| 2010/0036533 | A1 | | 2/2010 | Masuda et al. | |
| 2010/0036566 | A1 | | 2/2010 | Hayami | |
| 2010/0258366 | A1 | * | 10/2010 | Kim | 180/15 |
| 2012/0007418 | A1 | * | 1/2012 | Furuyama | 303/11 |

FOREIGN PATENT DOCUMENTS

JP      2010-038051 A      2/2010

* cited by examiner

*Primary Examiner* — Fadey Jabr
*Assistant Examiner* — Martin Weeks
(74) *Attorney, Agent, or Firm* — Gifford, Krass, Sprinkle, Anderson & Citkowski, P.C.

(57) ABSTRACT

A control apparatus for a vehicle includes a control unit configured to, when accelerator operation and brake operation are simultaneously performed, execute output reduction control that reduces drive power source output, and configured to perform recovery of the drive power source output, when it becomes impossible to certainly determine presence or absence of the brake operation during execution of the output reduction control.

7 Claims, 6 Drawing Sheets

CONTROL APPARATUS FOR VEHICLE

INCORPORATION BY REFERENCE

The disclosure of Japanese Patent Application No. 2011-270413 filed on Dec. 9, 2011 including the specification, drawings and abstract is incorporated herein by reference in its entirety.

BACKGROUND OF THE INVENTION

1. Field of the Invention

The invention relates to a control apparatus for a vehicle that reduces the output of a drive power source when an accelerator and a brake are simultaneously operated.

2. Description of Related Art

As an example of a control system applied to a vehicle, there is a brake override system as shown in Japanese Patent Application Publication No. 2010-038051 (JP 2010-038051 A). In the brake override system described in JP 2010-038051 A, when a driver of a vehicle simultaneously performs accelerator operation (depression of an accelerator pedal) and brake operation (depression of a brake pedal), the braking of the vehicle based on the brake operation is given priority over the acceleration of the vehicle based on the accelerator operation by reducing the opening degree of a throttle valve so as to reduce the engine output and therefore reduce the drive force of the vehicle.

The brake override system determines the presence or absence of brake operation performed by a driver of the vehicle, for example, from results of detection of the brake hydraulic pressure produced by a brake master cylinder, the depressing force on the brake pedal, etc. If a sensor that performs such detection or a signal line connected to the sensor has abnormality or the like so that it becomes impossible to certainly determine the presence or absence of brake operation performed by the driver while the vehicle drive force has been reduced by the brake override system, the drive force of the vehicle remains at a reduced level even if the driver discontinues the brake operation. As a result, in some cases, the vehicle is not driven or operated exactly as the driver intends, and drivability may thus deteriorate.

SUMMARY OF THE INVENTION

The invention provides a control apparatus for a vehicle that is capable of suitably restraining deterioration of drivability.

A control apparatus for a vehicle in accordance with an aspect of the invention includes a control unit configured to, when accelerator operation and brake operation are simultaneously performed, execute output reduction control that reduces drive power source output, and configured to perform recovery of the drive power source output, when it becomes impossible to certainly determine presence or absence of the brake operation during execution of the output reduction control.

In the foregoing configuration, during a reduced state of the drive power source output according to simultaneous operation of an accelerator and a brake performed by a driver, the drive power source output is recovered from the reduced level if it becomes impossible to certainly determine the presence or absence of the brake operation performed by the driver. Therefore, even when it is impossible to certainly determine the presence or absence of brake operation, an event that a reduced state of the drive power source output continues will be avoided. Therefore, according to the foregoing configuration, deterioration of drivability can be suitably restrained.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Figure 1:
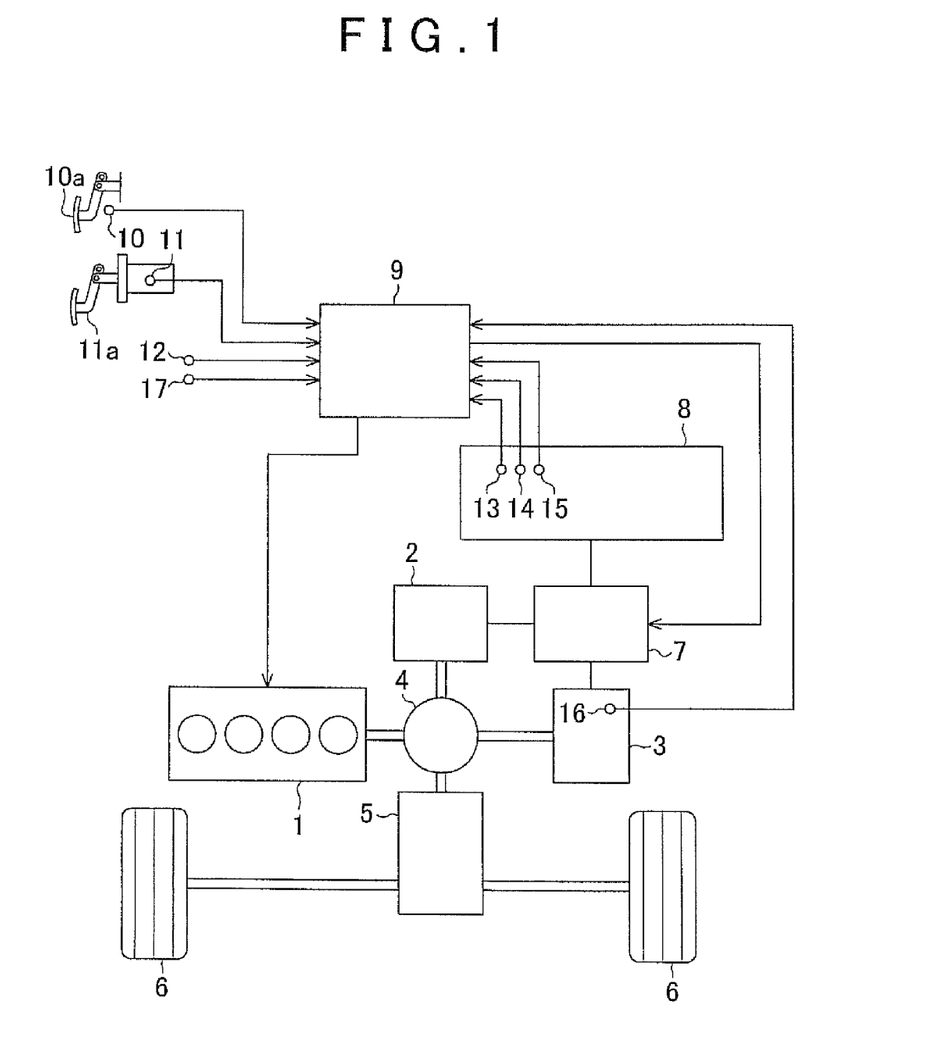
FIG. 1 is a schematic diagram schematically showing a configuration of a hybrid system of a hybrid vehicle, to which a first embodiment of a control apparatus for a vehicle of the invention is applied.

A first embodiment of the control apparatus for a vehicle of the invention will be described in detail hereinafter with reference to FIGS. 1 to 3.

Firstly, with reference to FIG. 1, a configuration of a hybrid system of a hybrid vehicle to which the control apparatus of this embodiment is applied will be described. This hybrid system includes an engine I that is a heat engine, and two motor-generators. In the following description, of the two motor-generators, one that is used mainly for electricity generation is referred to as the generator 2, and the other one, which is used mainly for producing drive force, is referred to as the electric motor 3.

The engine 1, the generator 2 and the electric motor 3 are connected to a power distribution mechanism 4 that includes a planetary gear mechanism. The power distribution mechanism 4 is connected to driving wheels 6 via a speed reducer mechanism 5. The power distribution mechanism 4 splits the motive power of the engine 1 into motive power that drives the generator 2 and motive power that drives the driving wheels 6.

The rotation speeds of the engine 1, the generator 2 and the driving wheels 6 connected via the power distribution mechanism 4 have such a relationship as to be always connected by a straight line in an alignment chart that illustrates the state of rotation of the planetary gear of the power distribution mechanism 4. Therefore, in this hybrid system, the speed ratio between the engine 1 and the driving wheels 6, that is, the ratio of the rotation speed of the engine 1 to the rotation speed of the driving wheels 6, can be changed by changing the rotation speed of the generator 2.

Furthermore, the hybrid system includes a power control unit 7 that has a voltage boost converter and an inverter. The voltage boost converter boosts the voltage of the hybrid drive-purpose battery 8 to a voltage that is needed for driving the generator 2 and the electric motor 3. The inverter converts the high-voltage direct current (DC current) that has been boosted by the voltage boost converter to alternating current (AC current) that is supplied to the generator 2 and the electric motor 3. Furthermore, when the generator 2 and/or the electric motor 3 functions as a generator, the inverter converts the AC current generated by the generator 2 and/or the electric motor 3 into DC current.

This hybrid system is controlled by an electronic control unit 9. The electronic control unit 9 includes a central processing unit (CPU) that performs computation processes related to various controls of the hybrid system, a read-only memory (ROM) in which programs and data for the controls are stored beforehand, and a random access memory (RAM) that temporarily stores results of computation provided by the CPU, results of detection provided by sensors, etc.

Detection signals from sensors that are provided at various portions of the hybrid vehicle are input to the electronic control unit 9. Such sensors include an accelerator position sensor 10, a master cylinder pressure sensor 11, a vehicle speed sensor 12, a battery temperature sensor 13, a battery voltage sensor 14, a battery current sensor 15, an electric motor temperature sensor 16, etc. The accelerator position sensor 10 detects the amount of depression of an accelerator pedal 10*a* (accelerator operation amount). The master cylinder pressure sensor 11 detects the master cylinder pressure that is produced according to the depression of a brake pedal 11*a*. The vehicle speed sensor 12 detects the vehicle speed of the hybrid vehicle. The battery temperature sensor 13, the battery voltage sensor 14 and the battery current sensor 15 detect the temperature, voltage and current, respectively, of the hybrid drive-purpose battery 8. The electric motor temperature sensor 16 detects the temperature of the electric motor 3.

The electronic control unit 9 also receives input of a signal from a stop lamp switch 17 (stop lamp signal). The stop lamp switch 17 detects the depression of the brake pedal 11*a* carried out by a driver of the vehicle, and outputs the stop lamp signal. On the basis of the stop lamp signal, a stop lamp is turned on.

The electronic control unit 9, on the basis of results of detection provided by the sensors, calculates an output of the engine 1 and/or the electric motor 3 commensurate with the state of operation of the hybrid vehicle, and then sends output requirements to the engine 1 and the electric motor 3. In this manner, the electronic control unit 9 controls the drive force of the hybrid vehicle. Next, details of a drive force control of the hybrid vehicle will be described.

In the drive force control, the electronic control unit 9 firstly calculates the magnitude of output of the hybrid system that the driver demands, as a required output, on the basis of the accelerator operation amount detected by the accelerator position sensor 10 and the vehicle speed detected by the vehicle speed sensor 12.

Furthermore, the electronic control unit 9 calculates the value of SOC (state of charge) of the hybrid drive-purpose battery 8 on the basis of the detection signals from the battery temperature sensor 13, the battery voltage sensor 14 and the battery current sensor 15. Then, on the basis of the required output and the SOC value, the electronic control unit 9 calculates a required total output that is a required value of the output of the hybrid system, which is the drive power source of the hybrid vehicle (hereinafter, the output of the hybrid system will be referred to as the HVS output). The HVS output is the sum of the output of the engine 1, the output of the generator 2 and the output of the electric motor 3, and refers to the motive power transmitted from the power distribution mechanism 4 to the speed reducer mechanism 5. Incidentally, when the generator 2 and/or the electric motor 3 generates electricity, the HVS output is calculated on the assumption that the output of the generator 2 and/or the electric motor 3 has a negative value whose absolute value equals the motive power consumed for the electricity generation.

Subsequently, on the basis of the required total output, the electronic control unit 9 calculates a target engine rotation speed and a required engine output, and sends a corresponding command to the engine 1. In the engine 1, engine control, such as fuel injection control, injection timing control, etc., is performed according to the command from the electronic control unit 9 so as to provide an engine output commensurate with the required engine output and an engine rotation speed commensurate with the target engine rotation speed.

Furthermore, the electronic control unit 9 calculates the required torque demanded by the driver which is commensurate with the state of travel of the hybrid vehicle. This required torque is the output of the hybrid system that is needed in order to obtain the HVS output commensurate with the required total output at the present vehicle speed.

Then, the electronic control unit 9 calculates torque command values for the generator 2 and the electric motor 3 on the basis of the required torque demanded by the driver and of the engine torque found from the required engine output and the target engine rotation speed, respectively. Then, the electronic control unit 9 sends to the power control unit 7 the calculated torque command values for the generator 2 and the electric motor 3. Incidentally, each of the torque command values for the generator 2 and the electric motor 3 is set to a positive value when the power running operation of the generator 2 or the electric motor 3 is performed, and to a negative value when the regenerative operation thereof is performed. According to the commands, the power control unit 7 controls the driving AC current of the generator 2 and/or the electric motor 3 or the generated AC current thereof so that the generator 2 and the electric motor 3 outputs torque commensurate with the torque command values.

Furthermore, this hybrid system adopts a brake override system (BOS) that gives priority to the braking of the vehicle based on the depression of the brake pedal 11*a* (brake operation) over the acceleration of the vehicle based on the depression of the accelerator pedal 10*a* (accelerator operation). Details of the BOS will next be described.

In this hybrid system, the BOS is realized through the below-described control performed by the electronic control unit 9. That is, the electronic control unit 9 determines the presence or absence of depression of the accelerator pedal 10*a* on the basis of the detection signal from the accelerator position sensor 10 and the presence or absence of depression of the brake pedal 11*a* on the basis of the detection signal from the master cylinder pressure sensor 11 while the hybrid vehicle is traveling. Then, if it is determined that the accelerator pedal 10*a* and the brake pedal 11*a* have been simultaneously depressed, that is, the driver has simultaneously performed accelerator operation and brake operation, the electronic control unit 9 activates the BOS to reduce the HVS output.

The reduction of the HVS output by the BOS is performed in the following procedure. That is, when it is determined that the driver has simultaneously performed accelerator operation and brake operation, the electronic control unit 9 reduces the required total output. That is, at this time, the electronic control unit 9 re-sets the required total output to a value that is smaller than the value calculated on the basis of the required output and the SOC value.

Next; the electronic control unit 9 calculates a target engine rotation speed and a required engine output on the basis of the reduced required total output, and sends a corresponding command to the engine 1. Furthermore, the electronic control unit 9 calculates an engine torque from the calculated target engine rotation speed and the calculated required engine output, and calculates a required torque according to the reduced required total output. Then, on the basis of the required torque and the engine torque calculated as described above, the electronic control unit 9 calculates torque command values for the generator 2 and the electric motor 3, and sends a corresponding command to the power control unit 7.

Due to the above-described control, the HVS output is reduced from the value commensurate with the driver's accelerator operation amount (the amount of depression of the accelerator pedal 10a) if the driver simultaneously performs accelerator operation and brake operation. Therefore, the drive force of the vehicle is reduced, so that the braking of the vehicle based on brake operation is given priority over the acceleration of the vehicle based on accelerator operation.

Incidentally, it can happen that during the reduction of the HVS output due to activation of the BOS, the detection signal from the master cylinder pressure sensor 11 (brake operation signal) ceases or becomes abnormal in signal level due to abnormality of the master cylinder pressure sensor 11 or abnormality of a signal line of the sensor 11 or the like and, therefore, the presence or absence of brake operation performed by the driver cannot be determined from the detection signal. In such a case, even if the driver discontinues the brake operation, the electronic control unit 9 cannot determine or recognize the discontinuation of the brake operation, and therefore the BOS is not disabled or deactivated, so that the HVS output remains at the reduced level. Therefore, the vehicle becomes unable to be driven just as the driver intends, which can lead to deteriorated drivability. Incidentally, in the description below, the brake operation signal in a state in which the signal does not allow clear determination regarding the presence or absence of brake operation will be referred to as being uncertain.

Therefore, in this embodiment, if during operation of the BOS, the brake operation signal becomes uncertain and therefore it becomes impossible to determine the presence or absence of the driver's brake operation, the electronic control unit 9 instantly disables the BOS, and recovers the HVS output from the reduced level.

Figure 2:
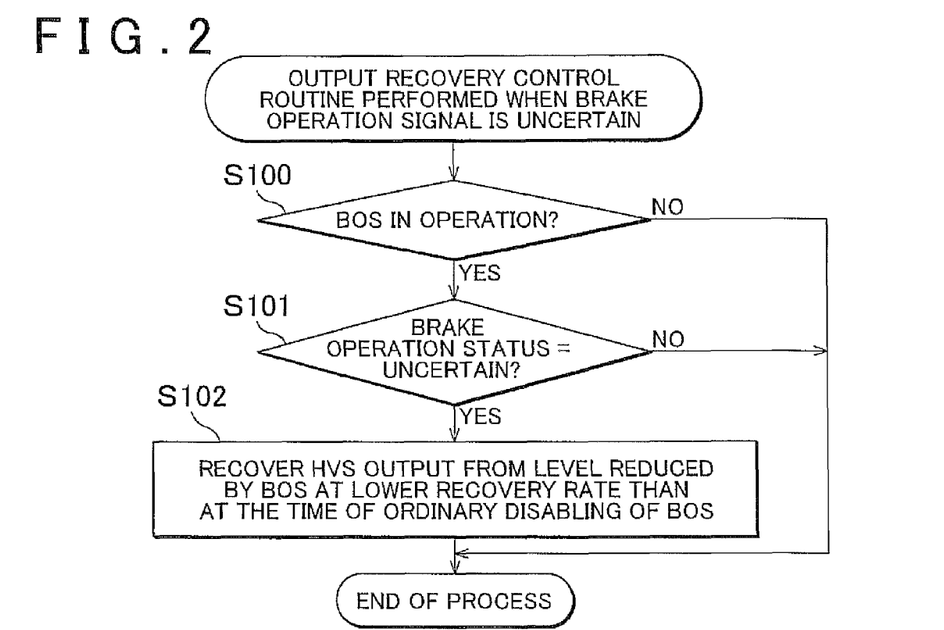
FIG. 2 is a flowchart showing a processing procedure of an output recovery control routine that is applied to the first embodiment and that is performed when a brake operation signal is uncertain.
Figure 3:
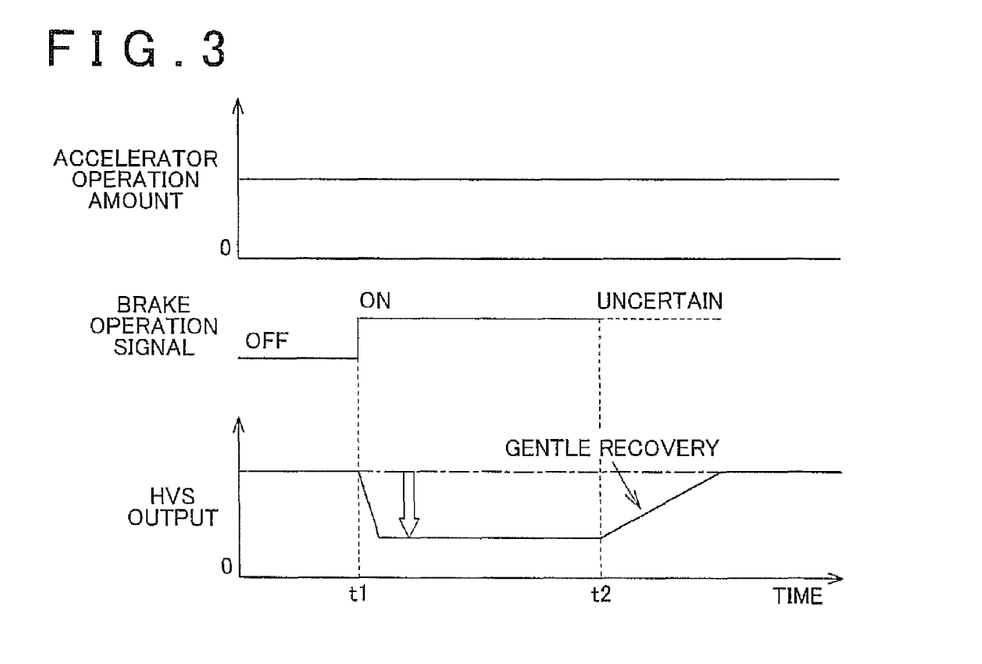
FIG. 3 is a time chart showing an example of a manner of control employed when the brake operation signal is uncertain, in accordance with the embodiment.

This control is performed through the process of an HVS output recovery control routine performed executed when the brake operation signal is uncertain, as shown in FIG. 2. The process of this routine is repeatedly executed by the electronic control unit 9 in a prescribed control cycle while the hybrid vehicle is traveling.

When the process of the routine starts, it is firstly determined in step S100 whether the BOS is in operation by determining whether the HVS output is in a reduced state according to the simultaneous performance of accelerator operation and brake operation. If the BOS is not in operation (NO in S100), the process of the present cycle of the routine immediately ends.

If the BOS is in operation (YES in S100), the process proceeds to step S101, in which it is determined whether the brake operation signal is uncertain. If the brake operation signal is not uncertain (NO in S101), the process of the present cycle of the routine ends. On the other hand, if the brake operation signal is uncertain (YES in S101), the process proceeds to step S102.

When the process reaches step S102, the HVS output is recovered in step S102 from the level reduced according to the operation of the BOS. The recovery of the HVS output in this step is performed at a lower recovery rate than when the HVS output is recovered following ordinary disabling or deactivation of the BOS, that is, when the HVS output is recovered on the basis of the clear determination that the brake operation has discontinued. After that, the process of the present cycle of the routine ends.

Next, operation of control at the time of the uncertain brake operation signal in accordance with the embodiment will be described with reference to FIG. 3. When the brake operation signal is turned on at time t1 during an accelerator operation, the BOS activates to reduce the HVS output. For a certain period of time after that, the on-state of the brake operation signal is continued and the state in which the HVS output has been reduced is continued. Then, when the brake operation signal becomes uncertain at time t, the recovery of the HVS output from the level reduced according to the activation of the BOS at time t1 starts at that time point (t2). The recovery of the HVS output at this time is performed more gently, that is, at a lower recovery rate, than at the time of ordinary disabling of the BOS.

According to the above-described control apparatus for a vehicle in accordance with the embodiment, the following advantages can be achieved. (1) In this embodiment, if the brake operation signal becomes uncertain during the state where the HVS output has been reduced by the BOS, the recovery from the reduced HVS output is performed. Therefore, even if it becomes impossible to certainly determine the presence or absence of brake operation during operation of the BOS, the event that the reduced level of the HVS output continues is avoided. Therefore, according to the embodiment, deterioration of drivability can be suitably restrained.

(2) In the embodiment, the recovery of the HVS output conducted when the presence or absence of brake operation cannot be certainly determined is performed at a lower recovery rate than the recovery conducted when the presence or absence of brake operation can be certainly determined. The recovery of the HVS output performed when the presence or absence of brake operation cannot be certainly determined is not guaranteed to be performed at the same timing as the driver's discontinuation of the brake operation. Therefore, if the recovery results in a sharp increase in the HVS output, the driver may sometimes feel uncomfortable. However, if the recovery of the HVS on that occasion is performed at a lower rate than usual, the uncomfortable feeling that the driver may feel can be suitably restrained.

Second Embodiment

Next, a second embodiment of the control apparatus for a vehicle of the invention will be described in detail with reference to FIGS. 4 and 5 as well. With regard to this embodiment of the invention and also a third embodiment described below, components common to those of the foregoing embodiment are denoted by the same reference characters, and detailed descriptions thereof will be omitted.

In the first embodiment, if the brake operation signal becomes uncertain during operation of the BOS, the HVS output is recovered at that time point. Since the recovery of the HVS output at this time is conducted irrespective of the intention of the driver, the recovery may sometimes makes the driver feel uncomfortable.

Meanwhile, if during operation of the BOS the driver increases the amount of depression of the accelerator pedal 10a, it can be estimated that the driver intends to re-accelerate the vehicle. Therefore, in this embodiment, if the brake operation signal becomes uncertain during the state where the HVS output has been reduced due to operation of the BOS, the HVS output is recovered according to the increase in the accelerator operation amount.

Figure 4:
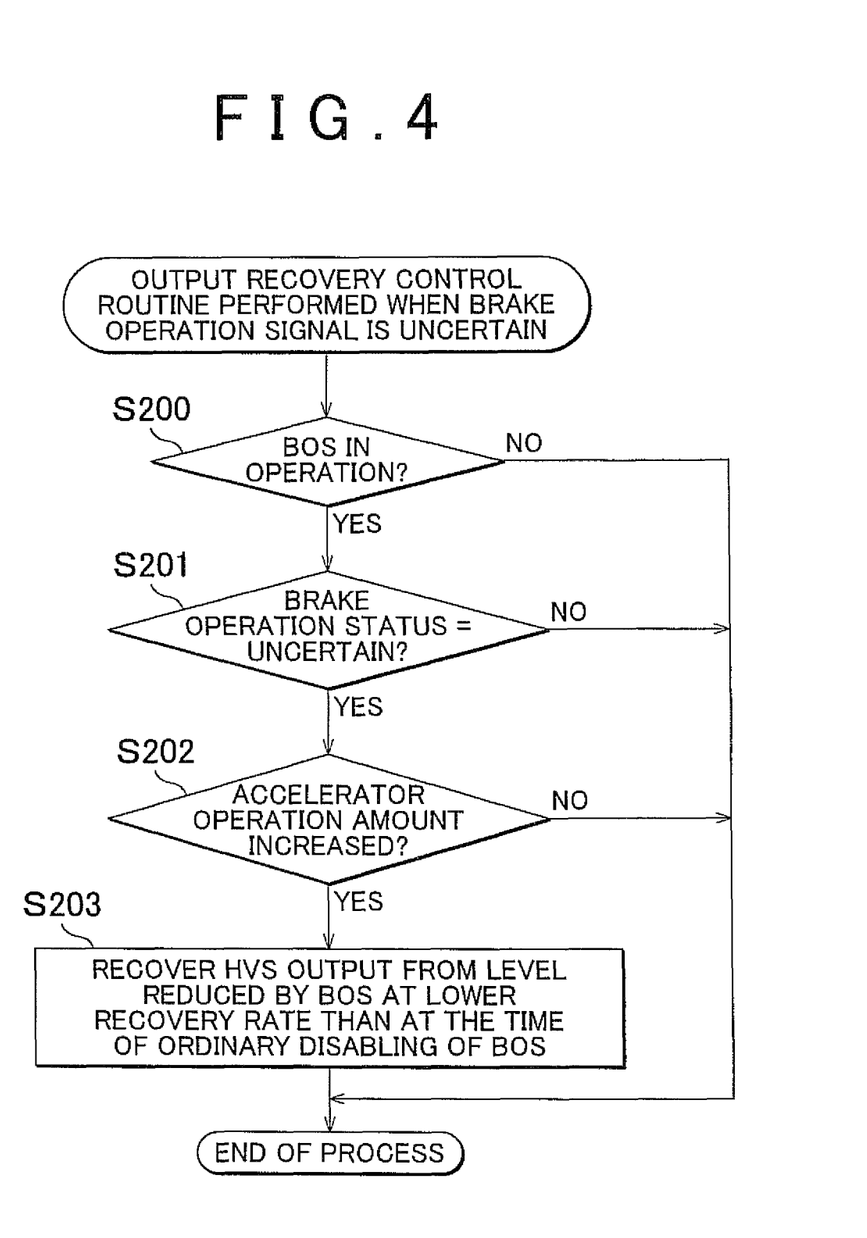
FIG. 4 is a flowchart showing a processing procedure of an output recovery control routine that is applied to a second embodiment of a control apparatus for a vehicle of the invention and that is performed when a brake operation signal is uncertain.
Figure 5:
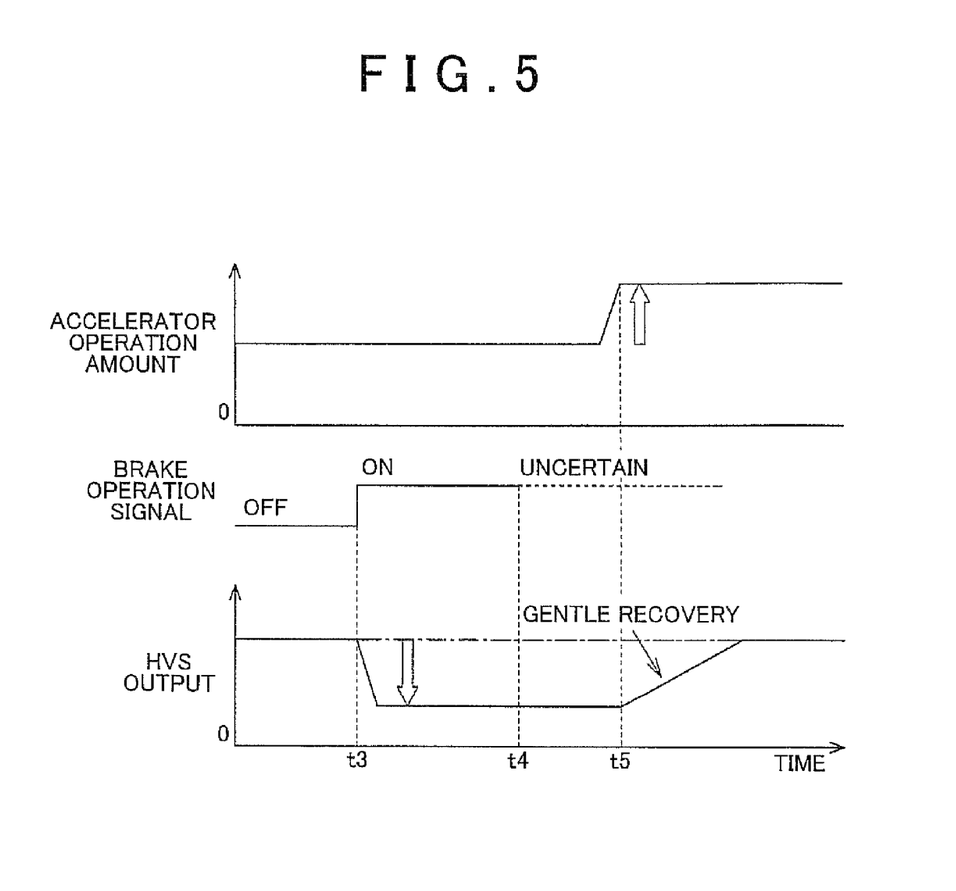
FIG. 5 is a time chart showing an example of a manner of control employed when the brake operation signal is uncertain, in accordance with the second embodiment.

This control is performed through the process of an HVS output recovery control routine executed when the brake operation signal is uncertain, as shown in FIG. 4. The process of the routine is repeatedly executed by the electronic control unit 9 in a prescribed control cycle while the hybrid vehicle is traveling.

When the process of the routine starts, it is firstly determined in step S200 whether the BOS is in operation by determining whether the HVS output is at a reduced state according to simultaneous performance of accelerator operation and brake operation. If the BOS in not in operation (NO in S200), the process of the present cycle of the routine immediately ends.

On the other hand, if the BOS is in operation (YES in S200), the process proceeds to step S201. In step S201, it is determined whether the brake operation signal is uncertain. If it is determined that the brake operation signal is not uncertain (NO in S201), the process of the present cycle of the routine ends. On the other hand, if the brake operation signal is uncertain (YES in S201), the process proceeds to step S202.

When the process reaches step S202, it is determined in step S202 whether the accelerator operation amount has been increased. If it is determined that the accelerator operation amount has not been increased (NO in S202), the process of the present cycle of the routine ends. On the other hand, if the accelerator operation amount has been increased (YES in S202), the process proceeds to step S203.

When the process reaches step S203, the HVS output is recovered in step S203 from the level reduced according to operation of the BOS. However, at this time, the recovery of the HVS output is performed at a lower recovery rate than when the HVS output is recovered following ordinary disabling of the BOS, that is, when the HVS output is recovered on the basis of the clear determination that the brake operation has been discontinued. After that, the process of the present cycle of the routine ends.

Next, operation of control when the brake operation signal is uncertain in this embodiment will be described with reference to FIG. 5. When the brake operation signal is turned on at time t3 during an accelerator operation, the BOS activates to reduce the HVS output. For a certain period of time after that, the on-state of the brake operation signal is continued and the state in which the HVS output has been reduced is continued.

After that, at time t4, the brake operation signal becomes uncertain. However, at this time point, the reduced state of the HVS output is maintained, that is, the operation of the BOS is continued. Then, when the accelerator operation amount is increased at time t5, the recovery of the HVS output from the level reduced according to the activation of the BOS at time t3 starts at that time point (t5) at a gentler recovery rate than at the time of ordinary disabling of the BOS.

According to the above-described control apparatus for a vehicle in accordance with the embodiment, the following advantage can be achieved in addition to the above advantage of the item (2). (3) In this embodiment, when the brake operation signal becomes uncertain during the reduced state of the HVS output caused by the BOS, the recovery of the HVS output from the level reduced according to operation of the BOS is performed if the accelerator operation amount is increased. Therefore, even if it becomes impossible to certainly determine the presence or absence of brake operation, an event that a reduced state of the drive power source output continues will be avoided. Furthermore, the HVS output can be recovered at the timing at which the driver intends to re-accelerate the vehicle. Therefore, according to this embodiment, deterioration of drivability can be suitably restrained.

Third Embodiment

Next, a third embodiment of the control apparatus for a vehicle of the invention will be described in detail with reference to FIGS. 6 and 7 as well.

In the second embodiment, if the brake operation signal becomes uncertain during operation of the BOS, the recovery of the HVS output is carried out by estimating the driver's intention to re-accelerate the vehicle from the increase in the accelerator operation amount. In this case, it is possible to re-accelerate the hybrid vehicle according to the demand of the driver. However, since increase of the accelerator operation amount and discontinuation of brake operation are not always simultaneously performed, the recovery of the HVS output may sometimes be conducted at a timing different from the timing of the recovery performed when the brake operation signal is not uncertain.

Meanwhile, in some cases, the status of operation of the brake pedal 11a can be determined on the basis of another signal than the brake operation signal (detection signal from the master cylinder pressure sensor 11) that is used to determine whether to carry out the reduction of the HVS output by the BOS. For example, the status of the driver's operation of the brake pedal 11a can be estimated with certain accuracy also from the stop lamp signal that is output by the stop lamp switch 17 that is used to turn on the stop lamp. Therefore, in this embodiment, if the brake operation signal becomes uncertain, the recovery of the HVS output is carried out by estimating discontinuation of the brake operation from the stop lamp signal.

Figure 6:
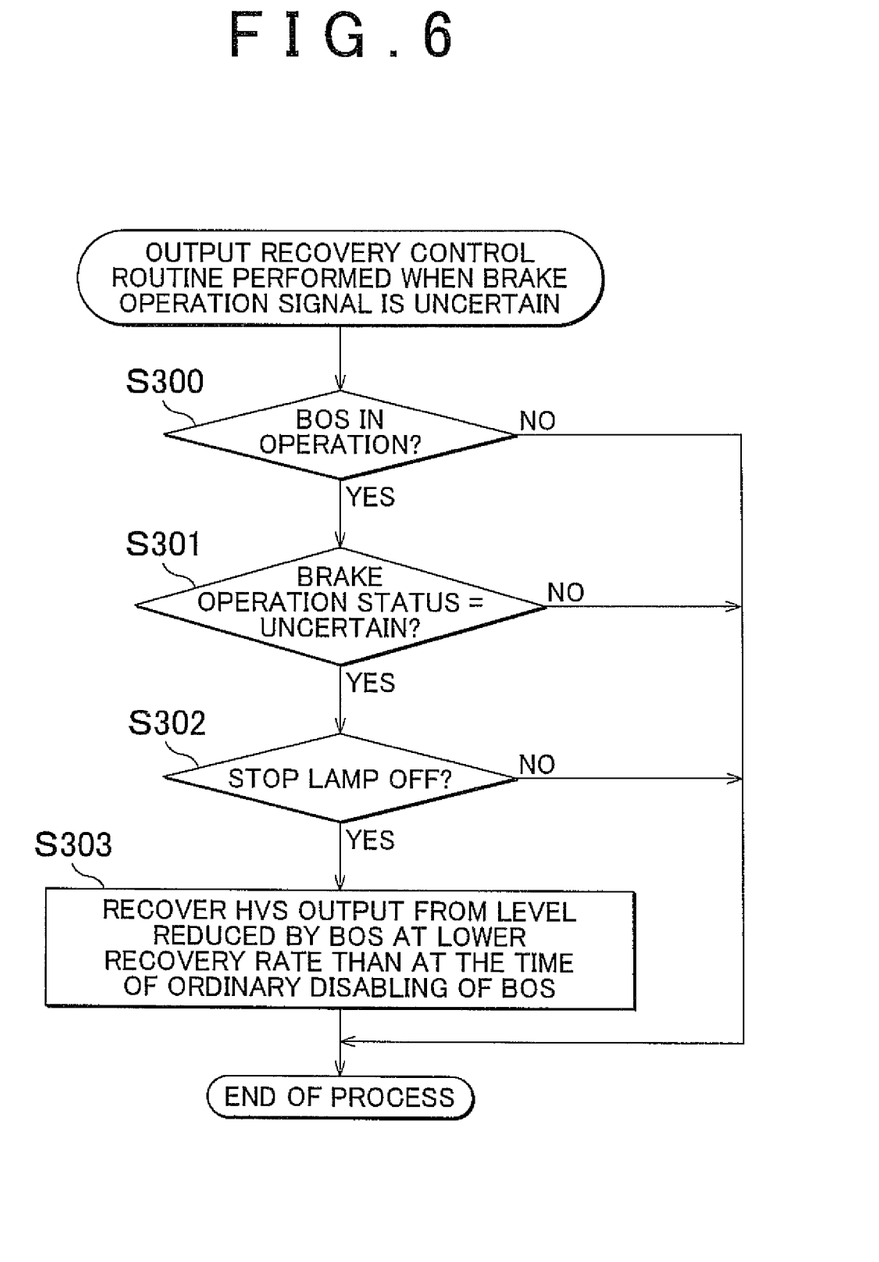
FIG. 6 is a flowchart showing a processing procedure of an output recovery control routine that is applied to a third embodiment of a control apparatus for a vehicle of the invention and that is performed when a brake operation signal is uncertain.
Figure 7:
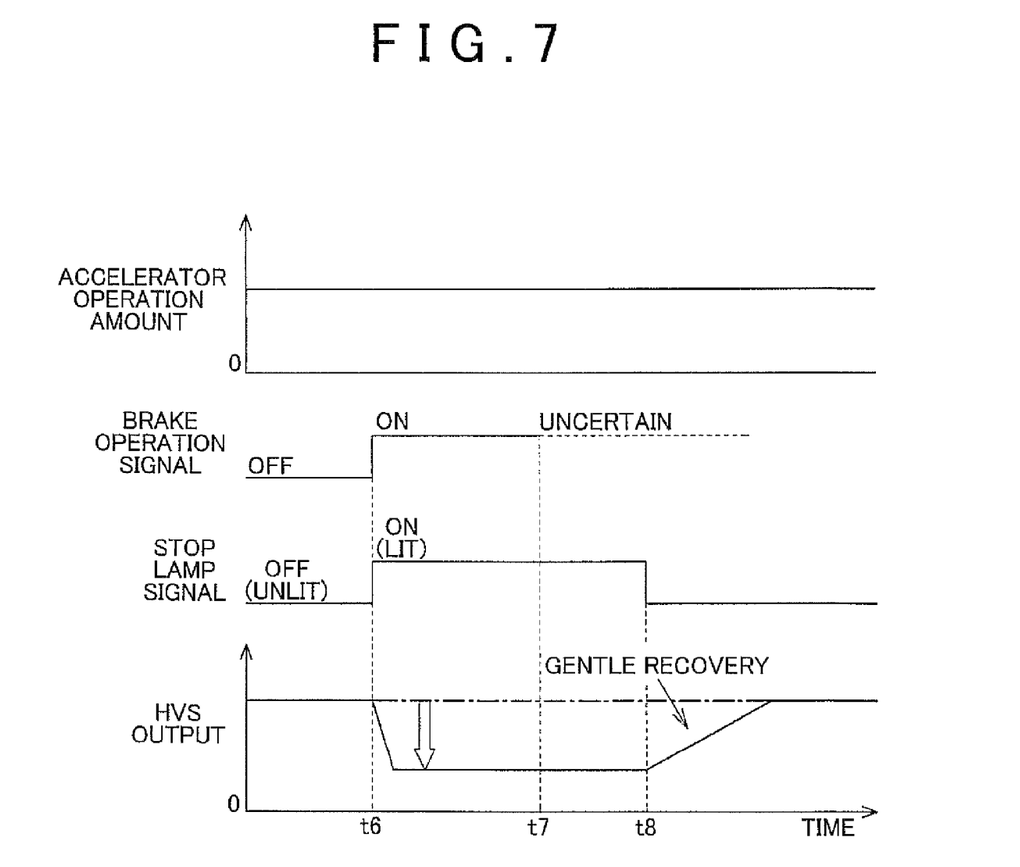
FIG. 7 is a time chart showing an example of a manner of control employed when the brake operation signal is uncertain, in accordance with the third embodiment.

This control is performed through the process of an HVS output recovery control routine executed when the brake operation signal is uncertain, as shown in FIG. 6. The process of the routine is repeatedly executed by the electronic control unit 9 in a prescribed control cycle while the hybrid vehicle is traveling.

When the process of the routine starts, it is firstly determined in step S300 whether the BOS is in operation by determining whether the HVS output is in a reduced state according to simultaneous performance of accelerator operation and brake operation. If the BOS in not in operation (NO in S300), the process of the present cycle of the routine immediately ends.

On the other hand, if the BOS is in operation (YES in S300), the process proceeds to step S301. In step S301, it is determined whether the brake operation signal is uncertain. If it is determined that the brake operation signal is not uncertain (NO in S301), the process of the present cycle of the routine directly ends. On the other hand, if the brake operation signal is uncertain (YES in S301), the process proceeds to step S302.

When the process reaches step S302, it is determined in step S302 whether the stop lamp has been turned off, that is, whether the stop lamp signal that the stop lamp switch 17 outputs has been turned off. If the stop lamp signal is on (NO in S302), the process of the present cycle of the routine directly ends. On the other hand, if the stop lamp signal is off (YES in S302), the process proceeds to step S303.

When the process reaches step S303, the HVS output is recovered in step S303 from the level reduced according to the operation of the BOS. However, at this time, the recovery of the HVS output is performed at a lower recovery rate than when the HVS output is recovered following ordinary disabling of the BOS, that is, when the HVS output is recovered on the basis of the clear determination that the brake operation has been discontinued. After that, the process of the present cycle of the routine ends.

Next, operation of control when the brake operation signal is uncertain in this embodiment will be described with reference to FIG. 7. When the brake operation signal is turned on at time t6 during an accelerator operation, the BOS activates to reduce the HVS output. For a certain period of time after that, the on-state of the brake operation signal is continued and the state in which the HVS output has been reduced is continued.

After that, at time t7, the brake operation signal becomes uncertain. However, at this time point, the reduced state of the HVS output is maintained, that is, the operation of the BOS is continued. Then, when the stop lamp signal is turned off at time t8, the recovery of the HVS output from the level reduced according to the activation of the BOS at time t6 starts at that time point (t8) at a gentler recovery rate than at the time of ordinary disabling of the BOS.

According to the above-described control apparatus for a vehicle in accordance with the embodiment, the following advantage can be achieved in addition to the above advantage of the item (2). (4) In this embodiment, if the brake operation signal becomes uncertain during operation of the BOS, the recovery of the HVS output is performed by estimating discontinuation of the brake operation on the basis of the stop lamp signal. Therefore, even when the presence or absence of brake operation cannot be certainly determined, an event that a reduced state of the drive power source output continues is avoided. Furthermore, the timing of the recovery of the HVS output can be more easily synchronized with discontinuation of the brake operation. Therefore, according to this embodiment, deterioration of drivability can be suitably restrained.

Incidentally, the foregoing embodiments can also be carried out with the following modifications.

In the third embodiment, when the brake operation signal becomes uncertain, the HVS output is recovered on the basis of the brake lamp (or stop lamp) signal. However, if there is another signal than the brake lamp (or stop lamp) signal which makes it possible to estimate the operation status of the brake pedal 11a, that signal may be used instead of the brake lamp (or stop lamp) signal. For example, a detection signal from a brake depression force sensor that detects the depression force on the brake pedal 11a or the like can be used as such an alternative signal.

In the foregoing embodiments, the recovery of the HVS output conducted when the brake operation signal becomes uncertain is carried out at a lower rate than the recovery of the HVS output conducted when the brake operation signal is not uncertain. However, the reduction of the recovery rate of the HVS output when the brake operation signal is uncertain may be omitted, for example, in the case where priority is given to securement of re-acceleration characteristic of the hybrid vehicle subsequent to disabling of the BOS, or the like.

In the foregoing embodiments, the presence or absence of the driver's accelerator operation is determined from the detection signal from the accelerator position sensor 10 and the presence or absence of the driver's brake operation is determined from the detection signal from the master cylinder pressure sensor 11, thereby determining whether to perform the reduction of the HVS output by the BOS. However, the presence or absence of accelerator operation and brake operation may also be determined on the basis of signals other than the aforementioned signals. Even in that case, if recovery of the HVS output in substantially the same manner as in the foregoing embodiments when the signal used to determine the presence or absence of brake operation during operation of the BOS becomes uncertain, deterioration of drivability is suitably restrained.

Although in the foregoing embodiments, the invention is applied to a hybrid vehicle, the invention is also applicable to vehicles other than the hybrid vehicles, in the same manner as in the embodiments, or in manners similar to the manners in the embodiments.

The control unit may be configured to perform the recovery of the drive power source output according to the increase in the accelerator operation amount.

In the foregoing configurations, even if the state where the presence or absence of a driver's brake operation cannot be certainly determined occurs during a reduced state of the drive power source output according to the driver's simultaneous operation of the accelerator and the brake, the drive power source output can be recovered from the reduced level, provided that the accelerator operation amount is increased. Therefore, even when it is impossible to certainly determine the presence or absence of brake operation, an event that a reduced state of the drive power source output continues will be avoided. Therefore, according to the foregoing configuration, deterioration of drivability can be suitably restrained.

When a signal to be used to determine the presence or absence of the brake operation in determining whether it is necessary to execute the output reduction control becomes unindicative of either the presence of the brake operation or the absence of the brake operation, for example, it is determined that it has become impossible to certainly determine the presence or absence of brake operation.

The control unit may be configured so that when it becomes impossible to certainly determine the presence or absence of brake operation on the basis of the signal to be used to determine the presence or absence of brake operation in determining whether it is necessary to execute the output reduction control, the control unit estimates whether the brake operation has discontinued, based on a second signal other than the aforementioned signal, and carries out recovery of the drive power source output if it is estimated that the brake operation has discontinued.

In the foregoing configuration, even if the state where the presence or absence of a driver's brake operation cannot be certainly determined occurs during a reduced state of the drive power source output according to the driver's simultaneous operation of the accelerator and the brake, the drive power source output can be recovered from the reduced level, provided that it is estimated that the brake operation has discontinued, on the basis of another signal than the signal that is usually used to determine the presence or absence of brake operation. Therefore, even when it becomes impossible to certainly determine the presence or absence of brake operation, an event that a reduced state of the drive power source output continues will be avoided. Therefore, according to the foregoing configuration, deterioration of drivability can be suitably restrained. Incidentally, examples of the second signal to be used to estimate whether the brake operation has discontinued include the stop lamp signal that is turned on and off according to the turning on and off of the stop lamps of the vehicle.

The recovery of the HVS output conducted when the presence or absence of brake operation cannot be certainly determined is not guaranteed to be performed at the same timing as the driver's discontinuation of the brake operation. Therefore, if the recovery results in a sharp increase in the HVS output, the driver may sometimes feel uncomfortable. Therefore, the recovery of the HVS output conducted when it becomes impossible to certainly determine the presence or absence of brake operation may be performed at a lower recovery rate than a rate, at which the recovery is performed when it has been determined that brake operation is absent.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

What is claimed is:

1. A control apparatus for a vehicle, comprising
an electronic control unit programmed to, when accelerator operation and brake operation are simultaneously performed, execute output reduction control that reduces drive power source output, and the electronic control unit programmed to perform recovery of the drive power source output, when it becomes impossible to certainly determine presence or absence of the brake operation during execution of the output reduction control.

2. The control apparatus according to claim 1, wherein
the electronic control unit is configured to perform the recovery of the drive power source output according to increase in accelerator operation amount.

3. The control apparatus according to claim 1, wherein
the electronic control unit is configured to determine that it has become impossible to certainly determine the presence or absence of the brake operation, provided that a signal to be used to determine the presence or absence of the brake operation in determining whether it is necessary to execute the output reduction control becomes unindicative of either the presence of the brake operation or the absence of the brake operation.

4. The control apparatus according to claim 1, wherein
the electronic control unit is configured so that when it becomes impossible to certainly determine the presence or absence of the brake operation based on the signal to be used to determine the presence or absence of the brake operation in determining whether it is necessary to execute the output reduction control, the electronic control unit estimates whether the brake operation has discontinued, based on a second signal other than said signal, and carries out the recovery of the drive power source output if it is estimated that the brake operation has discontinued.

5. The control apparatus according to claim 4, wherein
the second signal is a stop lamp signal.

6. The control apparatus according to claim 4, further comprising
a brake depression force sensor, wherein
the second signal is a detection signal from the brake depression force sensor.

7. The control apparatus according to claim 1, wherein
the electronic control unit is configured so that the recovery of the drive power source output performed when it becomes impossible to certainly determine the presence or absence of the brake operation is performed at a lower rate than a rate, at which the recovery of the drive power source output is performed when it has been determined that the brake operation is absent.

* * * * *